(12) United States Patent
Shuart et al.

(10) Patent No.: US 8,092,131 B2
(45) Date of Patent: *Jan. 10, 2012

(54) CLINCH SPACER AND METHOD OF ATTACHING THE SAME TO A PANEL

(75) Inventors: David M. Shuart, Summerville, SC (US); John M. Parker, Ann Arbor, MI (US)

(73) Assignee: Whitesell International Corporation, Taylor, MI (US)

( * ) Notice: Subject to any disclaimer, the term of this patent is extended or adjusted under 35 U.S.C. 154(b) by 897 days.

This patent is subject to a terminal disclaimer.

(21) Appl. No.: 11/874,715

(22) Filed: Oct. 18, 2007

(65) Prior Publication Data
US 2008/0120825 A1    May 29, 2008

Related U.S. Application Data

(63) Continuation-in-part of application No. 11/498,390, filed on Aug. 3, 2006, now Pat. No. 7,698,799.

(51) Int. Cl.
*F16B 37/06*    (2006.01)
(52) U.S. Cl. ........................ 411/181; 411/188
(58) Field of Classification Search .......... 411/179–181, 411/183, 188, 533
See application file for complete search history.

(56) References Cited

U.S. PATENT DOCUMENTS

| | | | |
|---|---|---|---|
| 1,112,525 A * | 10/1914 | Darling | ...................... 248/187.1 |
| 1,114,013 A | 10/1914 | Millar | |
| 2,486,769 A | 12/1942 | Watson | |
| 2,741,289 A | 4/1956 | Grow | |
| 2,972,730 A | 2/1961 | Abrams | |
| 3,058,211 A | 10/1962 | Axtell | |
| 3,125,146 A | 3/1964 | Rosan | |
| 3,127,919 A | 4/1964 | Swanstrom | |
| 3,133,579 A | 5/1964 | Grimm et al. | |
| 3,187,796 A | 6/1965 | Double | |
| 3,253,631 A * | 5/1966 | Reusser | ........................ 411/179 |
| 3,299,500 A | 1/1967 | Double | |
| 3,367,685 A | 2/1968 | Church et al. | |

(Continued)

FOREIGN PATENT DOCUMENTS

CA    2501754    10/2006

(Continued)

OTHER PUBLICATIONS

PCT/US04/26259 International Search Report dated Oct. 28, 2005.

*Primary Examiner* — Flemming Saether
(74) *Attorney, Agent, or Firm* — Dierker & Associates, P.C.

(57) ABSTRACT

A method of attaching a clinch spacer to a panel including forming a clinch spacer having a body portion including an axial bore, an annular flange portion surrounding the bore and an annular barrel portion integral and coaxially aligned with the flange portion having a diameter less than the flange portion including an end face having an outer lip extending at an angle radially outwardly and axially from the end face; forming an opening in the panel; and driving the barrel portion through the opening in the panel against a die member having a generally V-shaped annular projecting lip which is driven against a second face of the panel, deforming the panel radially inwardly against the outer surface of the barrel portion and deforming the outer annular lip radially outwardly and axially against the panel, forming a secure installation.

7 Claims, 6 Drawing Sheets

U.S. PATENT DOCUMENTS

| | | | |
|---|---|---|---|
| 3,405,752 A * | 10/1968 | Neuschotz | 411/180 |
| 3,431,960 A * | 3/1969 | Neuschotz | 411/180 |
| 3,535,678 A | 10/1970 | Gulistan | |
| 3,809,139 A * | 5/1974 | Strain | 411/183 |
| 3,820,579 A | 6/1974 | Barry | |
| 3,878,598 A | 4/1975 | Steward | |
| 3,910,331 A | 10/1975 | Randall | |
| 4,018,257 A * | 4/1977 | Jack | 411/181 |
| 4,223,585 A | 9/1980 | Barth et al. | |
| 4,402,124 A | 9/1983 | Krueger | |
| 4,543,023 A | 9/1985 | Capuano | |
| 4,790,703 A * | 12/1988 | Wing | 411/260 |
| 4,940,375 A | 7/1990 | Marvell et al. | |
| 5,251,370 A | 10/1993 | Muller et al. | |
| 5,423,645 A | 6/1995 | Muller et al. | |
| 5,489,176 A | 2/1996 | Fultz | |
| 5,513,933 A | 5/1996 | Rom | |
| 5,528,812 A | 6/1996 | Muller | |
| 5,613,815 A | 3/1997 | Muller | |
| 5,644,830 A | 7/1997 | Ladouceur et al. | |
| 6,125,524 A | 10/2000 | Mueller | |
| 6,318,940 B1 * | 11/2001 | Mitts | 411/188 |
| 6,647,608 B2 | 11/2003 | Wojciechowski et al. | |
| 2005/0025610 A1 | 2/2005 | Vrana et al. | |

FOREIGN PATENT DOCUMENTS

| | | |
|---|---|---|
| EP | 0669473 | 8/1995 |
| EP | 1417420 | 5/2004 |
| JP | 09-151927 | 6/1997 |
| WO | 03016728 | 2/2003 |

\* cited by examiner

CLINCH SPACER AND METHOD OF ATTACHING THE SAME TO A PANEL

RELATED APPLICATIONS

This application is a continuation-in-part application of application Ser. No. 11/498,390, filed on Aug. 3, 2006, which is a continuation-in-part application of 10/641,566, filed Aug. 13, 2003, now U.S. Pat. No. 7,124,492, which was a continuation-in-part application of Ser. No. 10/245,938, filed Sep. 18, 2002, now U.S. Pat. No. 6,647,608, which application was a divisional application of Ser. No. 09/909,260, filed Jul. 19, 2001, now U.S. Pat. No. 6,592,311.

FIELD OF THE INVENTION

This invention relates to a method of attaching a clinch spacer to a panel, particularly including metal panels, which in a preferred application includes an unthreaded bore which telescopically receives a pin or rod, allowing the panel to which the clinch spacer is attached to pivot relative to the bracket, panel or plate to which the rod is attached. As used herein, the term "clinch spacer" generally refers to a self-clinching spacer or element, wherein the clinch spacer is permanently and preferably rigidly attached to the panel.

BACKGROUND OF THE INVENTION

Self-attaching fastener elements of the type disclosed in the above-referenced related parent applications are typically attached to a panel to attach a second element to the same panel. As used herein, the term "panel" may be any plate-like member, such as a metal panel, bracket, frame member or the like, as used, for example, by the automotive and appliance industries. The fastener may be a female fastener or a male fastener as disclosed in the above-referenced related applications. Following attachment of the fastener to the panel, the fastener is then utilized to attach a second element to the same panel. In mass production applications, self-attaching fasteners are typically installed in a panel in a die press, wherein the lower die member or die platen includes a die member or die button which supports the panel during installation and the upper die member or die platen includes a plunger which drives the fastener into the panel and the panel and/or the fastener is deformed to secure the fastener on the panel. Alternatively, the self-attaching fastener may be installed in a conventional press having opposed relatively moveable die members.

However, as discussed further below, the self-clinching spacer or clinch spacer of this invention has been designed for a different application than the fastener systems disclosed in the above referenced applications, but which still requires a very secure and rigid interconnection between the clinch spacer and the panel and a substantial pull-off or pull-out strength.

SUMMARY OF THE INVENTION

As briefly set forth above, the clinch spacer used in the method of attaching a clinch spacer to a panel of this invention was designed for a particular application, wherein the clinch spacer is permanently attached to a panel, preferably a metal panel, is self-clinching in a press, for example, to form a rigid and secure assembly wherein in a preferred embodiment of the intended application, the clinch spacer includes a smooth unthreaded bore to receive a pivot rod as described above. In one application of this invention, for example, the clinch spacer or a plurality of clinch spacers are permanently and rigidly attached to a metal plate which is a component of an automotive seat assembly which pivots relative to a support, such as a bracket, and wherein the support includes a rod or a plurality of metal rods telescopically received in the bores of the clinch spacers, pivotally guiding the movement of the seat component. As will be understood by those skilled in this art, the clinch spacer must therefore be rigidly attached to the metal plate and have excellent push-off strength. The method of attaching a clinch spacer of this invention achieves these objectives and may be easily and conveniently permanently attached to a panel in a conventional press as disclosed, for example, in the above-referenced related applications and patents.

The method of attaching a clinch spacer to a panel, preferably a metal panel, of this invention includes the following steps. Forming a clinch spacer including a body portion preferably having an axial bore, an annular flange portion extending radially surrounding the bore preferably having a generally planar annular face and an annular barrel portion integral and coaxially aligned with the annular flange portion surrounding the bore having a diameter less than the annular flange portion. The annular barrel portion includes an end face having an outer annular lip extending an angle radially outwardly and axially from the end face of the barrel portion. In one preferred embodiment, the end face of the barrel portion surrounding the bore is planar and extends generally perpendicular to an axis of the bore, such that the outer annular lip extends at an angle radially outwardly and axially from the planar end face and surrounds the bore.

The method of this invention further includes forming an opening in a panel having an internal diameter greater than an outer diameter of the outer annular lip of the barrel portion and the outer diameter of the barrel portion, but less than an outer diameter of the annular flange portion and wherein the panel has a thickness less than a distance between the annular face of the flange portion and an axial extent of the outer annular lip of the barrel portion, such that the annular outer lip of the barrel portion can be deformed over a face of the panel to secure the clinch spacer to the panel as described below. In one preferred embodiment, the opening through the panel includes a cylindrical portion having an internal diameter slightly greater than an outer diameter of the outer annular lip of the barrel portion, which receives the barrel portion during installation, and a frustoconical portion extending from the cylindrical portion.

The method of this invention further includes inserting the annular barrel portion through the opening in the panel for receiving a face of the panel on the annular face of the annular flange portion. As set forth above, the opening through the panel preferably has an inside diameter greater than an outside diameter of the barrel portion, such that the opening is spaced from the outer surface of the barrel portion. The method of this invention then includes deforming the outer annular lip of the annular barrel portion radially outwardly and axially against an opposed face of the panel and driving a die member having an annular projecting generally V-shaped lip against the opposed face of the panel, simultaneously deforming the panel radially inwardly, driving the inner surface of the panel opening against the outer surface of the annular barrel portion and beneath the annular lip of the annular barrel portion, permanently and rigidly attaching the clinch spacer to the panel.

In one alternative embodiment of the method of this invention, the opposed or first face of the panel is first supported on an end face of the die member or die button in a press, for example, and more specifically the first face of the panel is supported on the annular projecting generally V-shaped lip of the die button prior to installation of the clinch spacer to the panel. As set forth in the above-referenced related applications and patents and as will be understood by those skilled in this art, the die button may be supported in one die member or die platen of a press and the clinch spacer may be installed by an installation head located in the opposed die member or die platen, such that upon closing of the press, the barrel portion of the clinch spacer is driven through the panel opening. For example, in a typical application, the die button may be installed in the lower die member or die platen of a press and the installation head may be installed in the upper die member or die platen. The installation head includes a reciprocating plunger which drives the barrel portion of the clinch spacer through the panel opening and the generally planar annular face of the flange portion against a second face of the panel, thereby driving the first face of the panel against the annular projecting generally V-shaped lip, driving the annular projecting generally V-shaped lip of the die button into the first face of the panel and deforming the panel radially inwardly as described above. In one preferred embodiment of the die button, the die button includes annular planar face surrounding a central bore surrounded by the projecting generally V-shaped lip, opposite the outer annular lip of the barrel portion which deforms the annular lip of the barrel portion radially outwardly and axially against the first face of the panel, permanently and rigidly attaching the clinch spacer to the panel as described above.

In a further alternative embodiment of the clinch spacer of this invention, the outer annular lip extending from the end face of the annular barrel portion includes an upper face which is inclined outwardly and axially from the end face, and the method of this invention then includes driving the generally planar end face of the die member against the upper face of the annular lip, deforming the outer annular lip radially and substantially flush with the end face of the barrel portion. In the disclosed embodiment, the outer annular lip of the barrel portion further includes an outer face inclined toward the upper face and the end of the outer annular lip is arcuate, wherein the method includes driving the outer face of the annular lip radially outwardly and axially as set forth above against the second face of the panel during radial inward deformation of the panel against the outer surface of the barrel portion as set forth above.

In a still further alternative embodiment, the annular projecting generally V-shaped lip of the die button includes an outer face inclined inwardly from the annular end face of the die button and an inner face is inclined outwardly from the end face toward the outer face, and the method then includes driving the annular projecting generally V-shaped lip of the die button against the first face of the panel adjacent the opening through the panel. In one more preferred embodiment, the outer face of the projecting generally V-shaped annular projecting generally V-shaped lip of the die button defines a greater angle relative to the end face of the die button than the inner face, such that the method includes driving the annular projecting lip of the die button against the first face of the panel, wherein the inclined outer face of the projecting generally V-shaped lip further deforms the panel radially inwardly as described above. In the disclosed and one preferred embodiment, the annular projecting generally V-shaped lip of the die button further includes a planar end face inclined inwardly from the outer face to the inner face, wherein the method then includes driving the inwardly inclined end face of the projecting V-shaped lip against the first face of the panel, further deforming the panel radially inwardly, forming a most secure clinch spacer and panel assembly.

In a still another alternative embodiment of the clinch spacer, a body portion has an axial bore which, in one preferred embodiment is a smooth unthreaded cylindrical bore for the intended use or application, an annular flange portion extending radially around the axial bore having an annular end face which, in the disclosed embodiment is planar and extends generally perpendicular to the axis "A" of the cylindrical bore. In the disclosed embodiment of the clinch spacer, the outer surface of the annular flange portion is cylindrical and coaxially aligned with the axis "A" of the cylindrical bore. The clinch spacer further includes an annular barrel portion integral with the annular flange portion having a diameter less than the annular flange portion surrounding the axial bore including an end face having an outer annular lip, which extends at an angle radially outwardly and axially from the end face.

In the disclosed embodiment, the outer surface of the annular barrel portion is also cylindrical and coaxially aligned with the axis "A" of the axial bore and the annular flange portion. The clinch spacer further includes a plurality of circumferentially spaced radial ribs, integral with and extending from the annular end face. Each radial rib has a top face spaced above the plane of the annular end face and, in a preferred embodiment, the top face. The top face of each radial rib is inclined radially outwardly from the radial flange portion as illustrated and described above with regard to the radial ribs of the clinch spacer. The radial ribs further include side faces, which are inclined outwardly from the top face forming a trapezoidal-shape in cross-section. However, other anti-rotation ribs may also be utilized.

The method of attaching the clinch spacer having the radial ribs of this invention includes forming an opening in the panel and inserting the barrel portion through the opening in the panel, such that the annular face of the radial flange portion which includes the anti-rotation rib or ribs is opposite one face of the panel. The method of this invention then includes driving the annular end face of the annular flange portion against the panel adjacent the panel opening, thereby deforming the rib or ribs projecting therefrom into the one face of the panel.

Where the annular end face of the annular flange portion are circumferentially spaced and radially inclined, as described above, the ribs are driven into the panel, starting with the radial outer ends of the ribs, and moving progressively inwardly, assuring full deformation of the ribs into the panel and improved torque resistance. The panel section adjacent the panel opening is simultaneously driven radially inwardly toward the annular end face of the annular flange portion. Where the annular end face of the annular flange portion overlies the face of the panel, the panel is driven beneath the overlying surface, forming a secure installation.

As will be understood by those skilled in this art, various modifications may be made to the method of attaching a clinch spacer of this invention within the purview of the appended claims. The following description of the preferred drawings and the embodiment shown in the attached drawings are for illustrative purposes only and thus do not limit the scope of this invention except as specifically set forth in the appended claims.

DESCRIPTION OF THE PREFERRED EMBODIMENTS

Figure 1:
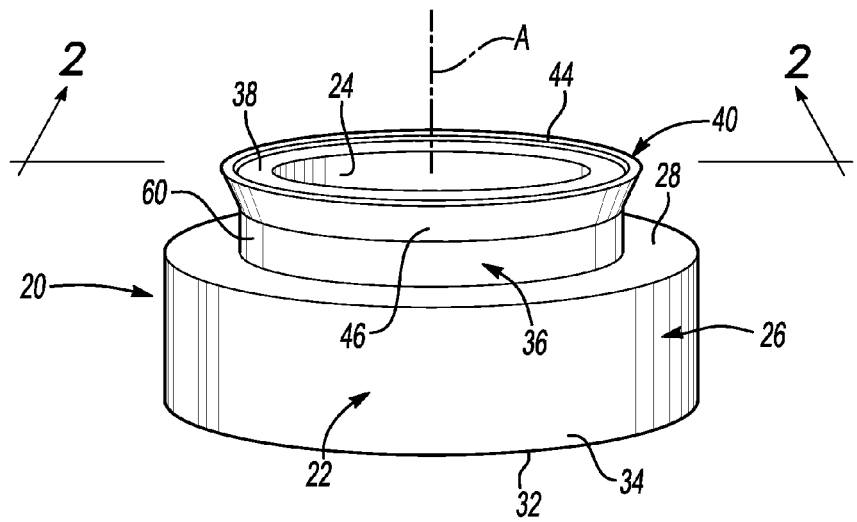
FIG. 1 is a side perspective view of one embodiment of a clinch spacer which may be utilized in the method of this invention.
Figure 2:
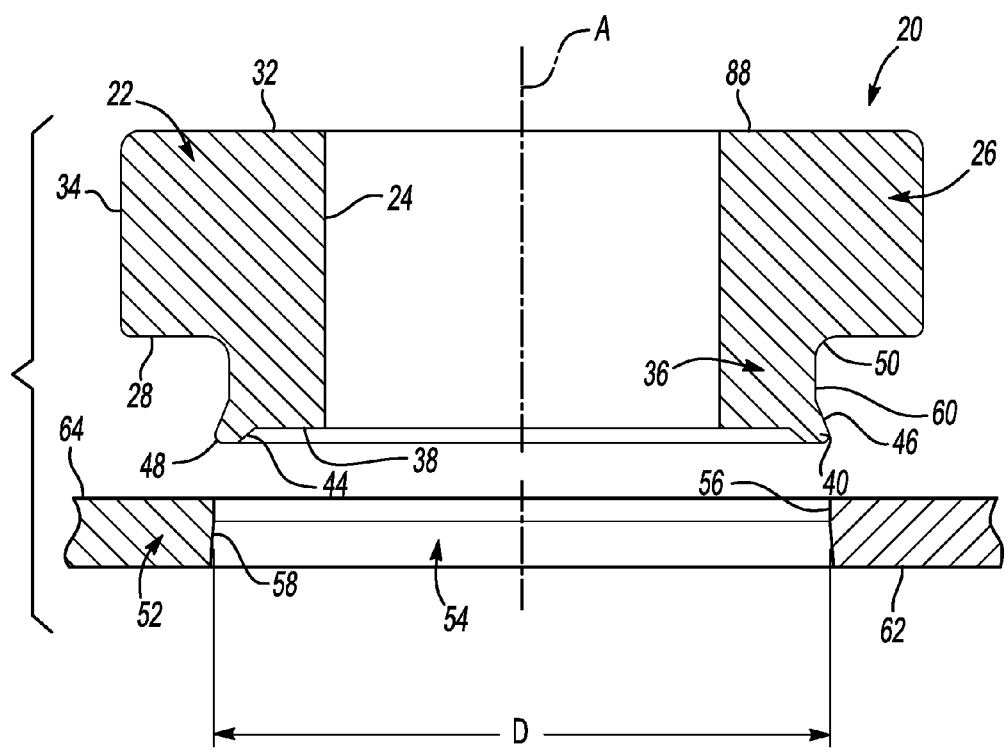
FIG. 2 is a side cross-sectional view of the clinch spacer illustrated in FIG. 1 opposite a panel prepared for attachment.

As best shown in FIGS. 1 and 2, the disclosed embodiment of the clinch spacer 20 includes a body portion 22 having an axial bore 24 which, in one preferred embodiment is a smooth unthreaded cylindrical bore for the intended use or application, an annular flange portion 26 extending radially around the axial bore 24 having an annular end face 28 which, in the disclosed embodiment is planar and extends generally perpendicular to the axis "A" of the cylindrical bore 24. In the disclosed embodiment of the clinch spacer 20, the outer surface 34 of the annular flange portion 26 is cylindrical and coaxially aligned with the axis "A" of the cylindrical bore 24. However, the outer surface 34 of the annular flange portion 26 may be any convenient shape. The preferred embodiment of the clinch spacer 20 further includes an annular barrel portion 36 integral with the annular flange portion 26 having a diameter less than the annular flange portion 26 surrounding the axial bore 24 including an end face 38 having an outer annular lip 40 which extends at an angle radially outwardly and axially from the end face 38. In the disclosed embodiment, the outer surface 60 of the annular barrel portion 36 is also cylindrical and coaxially aligned with the axis "A" of the axial bore 24 and the annular flange portion 26.

As best shown in FIG. 2, the annular end face 38 of the annular barrel portion 36 is planar and extends perpendicular to the axis "A" of the cylindrical bore 24. Further, the outer annular lip 40 includes an "upper" face 44 inclined radially outwardly and axially which, in one preferred embodiment, is planar. In the disclosed embodiment, the upper face 44 is planar and, in the disclosed embodiment, the upper face 44 of the inclined annular lip 40 of the barrel potion 36 is inclined relative to the end face 38 at an angle of about 30 degrees, or preferably between 20 and 40 degrees. As used herein, the term "upper" referring to the upper face 44 is arbitrary and, as described below, during installation is actually a lower face if the clinch spacer 20 is installed downwardly as disclosed below. The outer annular lip 40 further includes an outer face 46 inclined radially outwardly and axially from the outer surface 60 of the barrel portion 36 which, in the disclosed embodiment, is also planar and angled toward the upper face 44 of the outer annular lip 40 and the free end 48 of the outer annular lip 40 is arcuate, blending into the upper and outer faces 44 and 46, respectively. In the disclosed embodiment of the clinch spacer 20, the outer surface 60 of the barrel portion 36 blends into the annular end face 28 of the flange portion 26 in an arcuate surface 50. As set forth above, the described elements of the clinch spacer may be modified within the purview of the appended claims.

As set forth herein, this invention relates to a method of attaching a clinch spacer 20 to a panel 52 as disclosed, for example, in FIG. 2. In a preferred embodiment of the method of this invention, an opening 54 is preformed or prepunched through the panel 52 and the clinch spacer 20 is clinched and permanently attached to the panel 52. In the disclosed embodiment, the panel opening 54 includes a cylindrical opening 56 which receives the barrel portion 36 of the clinch spacer 20 and a frustoconical opening 58 opposite the cylindrical opening 56. In a preferred embodiment, the cylindrical opening 56 has a diameter "D" substantially equal to but greater than the outer diameter of the outer annular lip 40 and more substantially greater than the outer diameter of the outer surface 60 of the annular barrel portion 36, which in the disclosed embodiment, is cylindrical. As described below, a first face 62 of the panel 52 is first received on the annular projecting lip 74 of a die member or die button 68 disclosed below and a second face 64 of the panel 52 receives the annular barrel portion 36 of the clinch spacer 20. As will be understood, the terms "first" and "second" faces are arbitrary for ease of description only.

Figure 3:
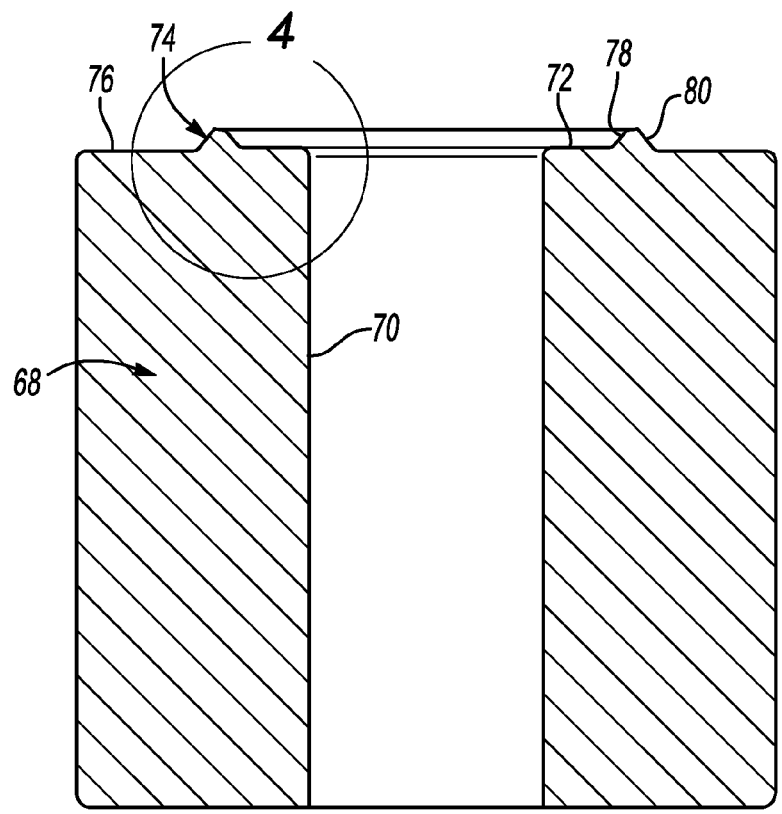
FIG. 3 is a side cross-section of one embodiment of a die member which may be utilized in the method of this invention.
Figure 4:
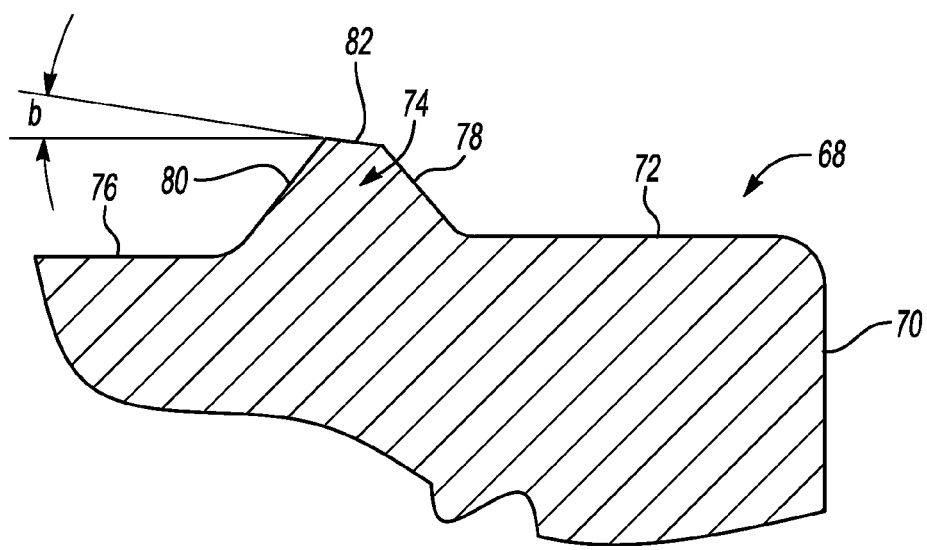
FIG. 4 is an enlarged side cross-sectional view of the end of the die button illustrated in FIG. 3.

One embodiment of a die button 68 which may be utilized in the method of this invention to form a clinch spacer and panel assembly is shown in FIGS. 3 and 4. In this embodiment, the die button 68 includes an axial bore 70 which, as described below, is coaxially aligned with the axial bore 24 though the clinch spacer 20 and the panel opening 54 during installation. In the disclosed embodiment, the die button 68 includes a first planar annular end face 72 surrounding the axial bore 70, an annular projecting generally V-shaped lip 74 surrounding the first end face 72 and a second end face 76 surrounding the annular projecting lip 74. The first annular end face 72 is preferably planar and the annular projecting lip 74 is preferably generally V-shaped as best shown in FIG. 4. In one preferred embodiment of the die button 68, the annular projecting lip 74 includes an inner face 78 which, in one preferred embodiment, is planar and inclined radially inwardly toward the bore 70 and an outer face 80 which is inclined radially outwardly toward the outer face 76 and may also be planar as best shown in FIG. 4, forming a generally V-shape. Further, in the disclosed embodiment, the annular lip includes an inclined planar end face 82 which, as best shown in FIG. 4, is inclined at an angle "b" radially inwardly toward the bore 70 to deform the panel 52 radially inwardly. Angle "b" is preferably between 5 and 15 degrees or more preferably about 10 degrees. Further, as best shown in FIG. 4, the angle between the second end face 76 of the die button 68 and the inner face 78 is greater than the angle between the first end face 72 and the inner face 80 by about 5 degrees or greater to further deform the panel radially inwardly as described below.

Figure 5:
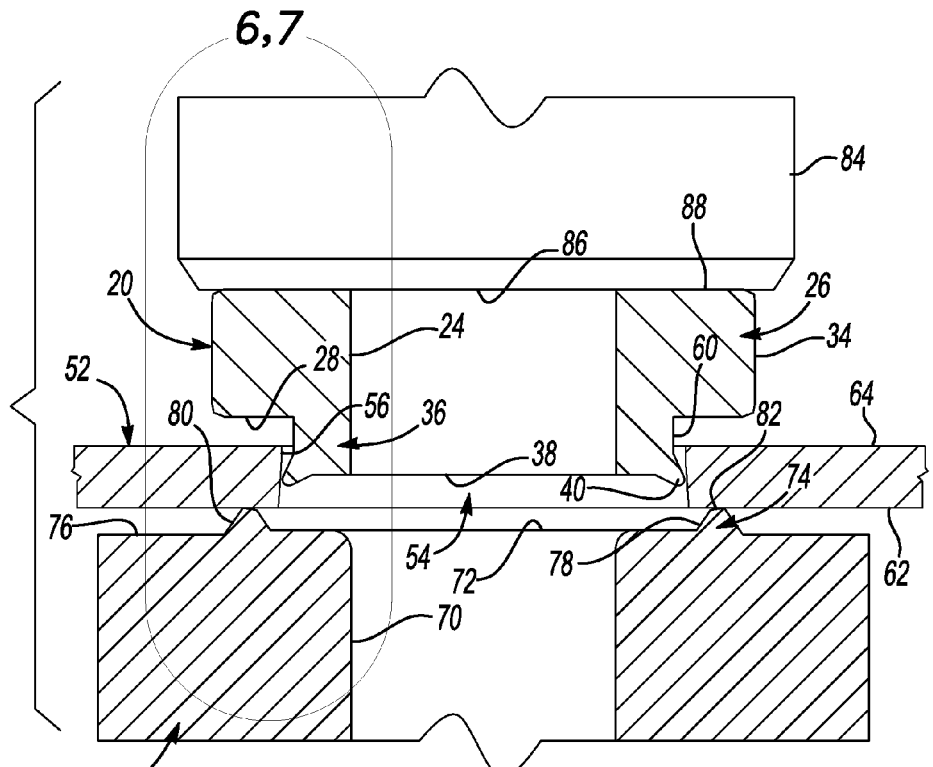
FIG. 5 is a side cross-sectioned view of the clinch spacer, die member and panel aligned for assembly.
Figure 6:
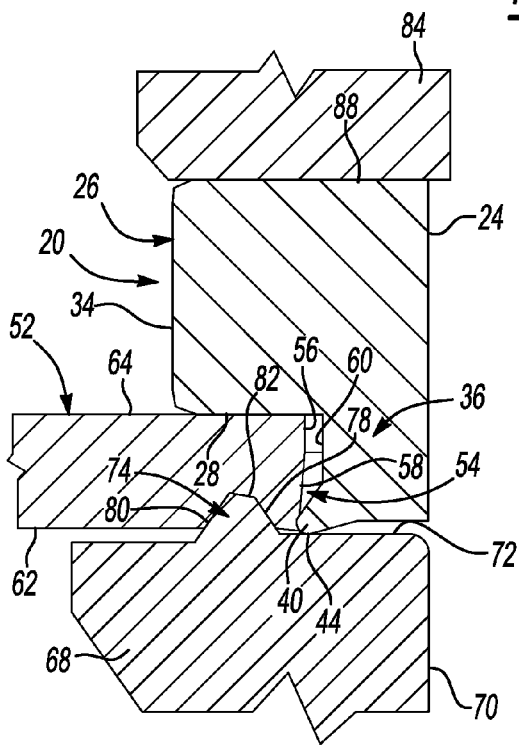
FIG. 6 illustrates the assembly during attachment similar to FIG. 5.
Figure 7:
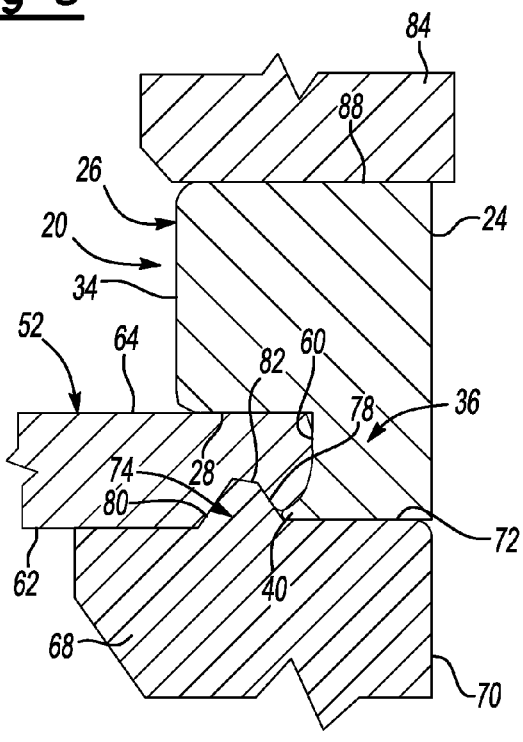
FIG. 7 is a side cross-sectional view of the final assembly.

As best shown in FIGS. 5 to 7, the method of this invention first includes aligning the clinch spacer 20 with the annular barrel portion 36 opposite and coaxially aligned with the opening 56 through the panel 52. In a typical application, the die button 68 will be fixed in the lower die member or die platen of a press (not shown) with the panel 52 supported and clamped on the die button 68 and the bore 70 through the die button coaxially aligned with the opening 54 through the panel 52. The clinch spacers 20 may be fed to an installation head (not shown) in an upper die member or die platen (not shown) which includes a reciprocating plunger 84. In the disclosed embodiment, the plunger 84 includes a planar end face 86 and the clinch spacer 20 includes an end or back face 88. During installation, the planar end face 86 of the plunger 84 is driven against a back face 88 of the clinch spacer 20, driving the annular barrel portion 36 of the clinch spacer 20 through the opening 54 in the panel 52 and the annular end face 28 of the annular flange portion 26 against the second face 64 of the panel 52. As described above, the first face 62 of the panel 52 is supported on the annular projecting lip 74 of the die button 68 as best shown in FIG. 5. As will be understood by those skilled in this art from the above description and FIGS. 5 to 7, as the reciprocating plunger 84 is driven against the back face 88 of the clinch spacer 20, the generally V-shaped annular projecting lip 74 of the die member 68 is driven into the first face 62 of the panel as shown in FIG. 6, deforming the panel 52 radially inwardly and the first or inner end face 72 of the die button 68 is then substantially simultaneously driven against the upper face 44 of the outer annular lip 40 of the annular barrel portion 36 deforming the annular lip 40 of the barrel portion 36 radially outwardly and axially against the first face 62 of the panel 52; that is, toward the annular end face 28 of the annular flange portion 26.

Finally, as best shown in FIG. 7, when the plunger 84 "bottoms" against the die button 68, the generally V-shaped annular projecting lip 74 of the die button 68 is driven fully into the first face 62 of the panel 52 and the outer annular lip 40 of the annular barrel portion 36 is deformed radially outwardly and against the first face 62 of the panel 52, forming a flush installation of the clinch spacer 20 in the panel 52. As set forth above, the end face 82 of the generally V-shaped annular projecting lip 74 may be inclined toward the bore 70 further assisting in the deformation of the panel 52 radially inwardly and against the cylindrical outer surface 60 of the annular barrel portion 36.

As will be understood by those skilled in this art, various modifications may be made to the method of attaching a clinch spacer to a panel as disclosed above within the purview of the appended claims. For example, the shape of the annular flange portion 26 and the annular barrel portion 36 may be modified as required by the particular application, particularly the shape of the outer surface 34 of the annular flange portion 26 and the shape of the outer surface 60 of the barrel portion 36. Although the application of the clinch spacer described above does not require anti-rotation means, radial ribs or other anti-rotation means may also be utilized as disclosed in the above-referenced related applications. As specifically set forth above, an object of this invention to provide a method of attaching a clinch spacer or other element of this type to a panel, particularly including a metal panel, wherein the clinch spacer is rigidly and permanently attached to the panel having an excellent push-off strength. Thus, the method of attaching a clinch spacer to a panel of this invention has achieved the objectives set forth above.

Figure 8:
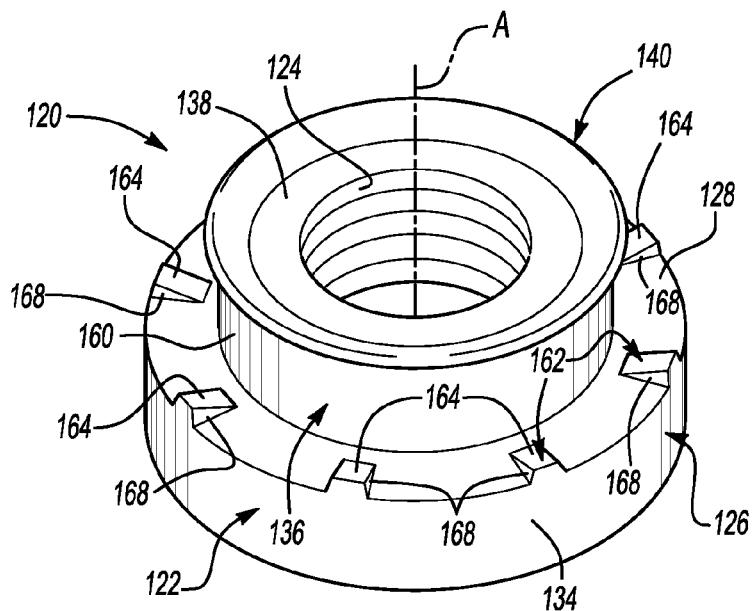
FIG. 8 is a perspective view of another embodiment of a clinch spacer which may be utilized in the method of this invention.
Figure 9:
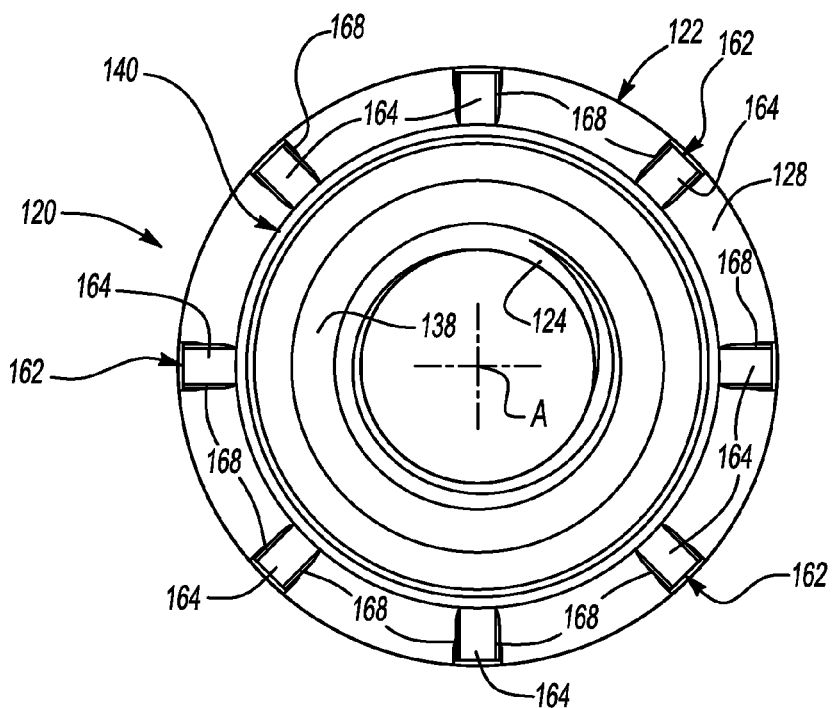
FIG. 9 is a top view of the clinch spacer shown in FIG. 8.
Figure 10:
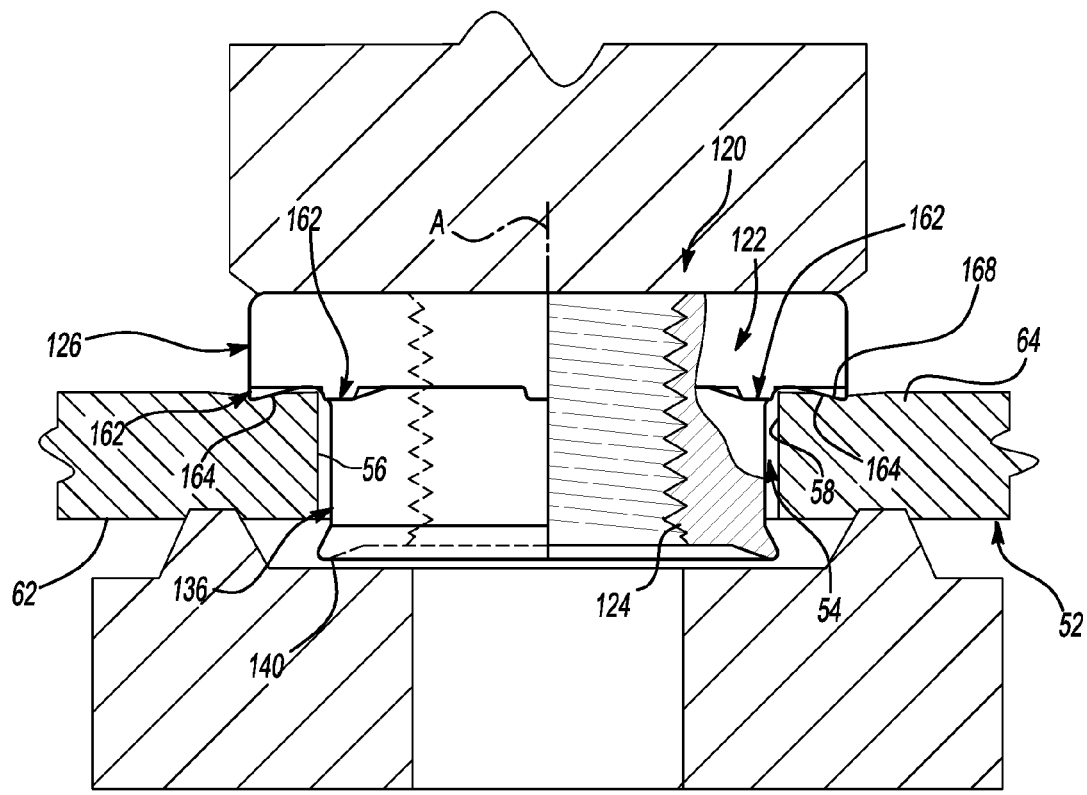
FIG. 10 is a side and partially cross sectional view of the clinch spacer illustrated in FIG. 8.
Figure 11:
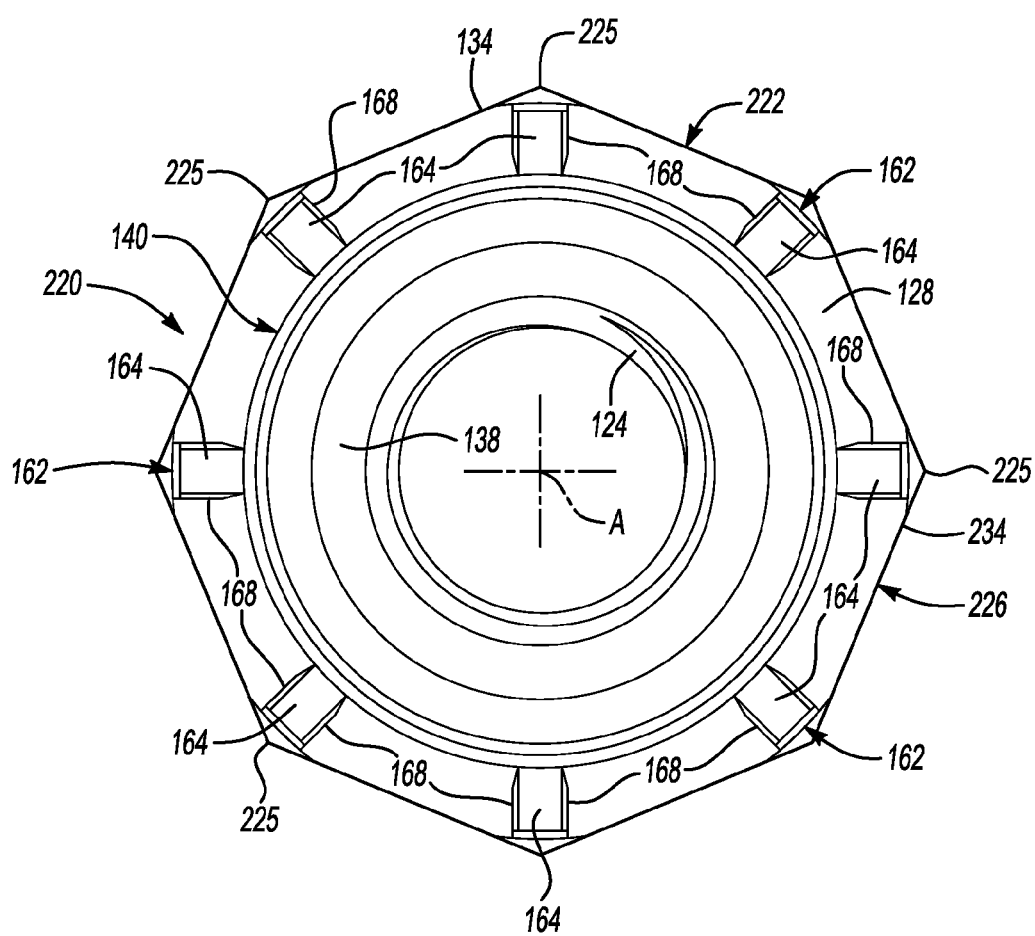
FIG. 11 is a top view of the clinch spacer shown in FIG. 8, but showing a polygonal outer surface of the annular flange portion.

Referring now to FIGS. 8 through 10, an alternative embodiment of the clinch spacer of present invention is generally shown at 120. As best shown in FIGS. 8 and 9, the disclosed embodiment of the clinch spacer 120 includes a body portion 122 having an axial bore 124 which, in one embodiment is a smooth unthreaded cylindrical bore for the intended use or application but is represented as being threaded. An annular flange portion 126 extends radially around the axial bore 124 having an annular end face 128 that is generally planar and extends generally perpendicular to the axis "A" of the cylindrical bore 124. The outer surface 134 of the annular flange portion 126 is cylindrical and coaxially aligned with the axis "A" of the cylindrical bore 124. However, the outer surface 134 of the annular flange portion 126 may be any convenient shape. For example, as shown in FIG. 11, the outer surface 234 of the annular flange portion 226 may be polygonal.

The clinch spacer 120 further includes an annular barrel portion 136 integral with the annular flange portion 126 having a diameter less than the annular flange portion 126 surrounding the axial bore 124. An outer annular lip 140 extends at an angle radially outwardly and axially from an end face 138 of the annular flange 126. The outer surface 160 of the annular barrel portion 136 is also cylindrical and coaxially aligned with the axis "A" of the axial bore 124 and the annular flange portion 126.

The clinch spacer 120 further includes a plurality of circumferentially spaced radial ribs 162, extending upwardly from the annular end face 128. In the embodiment depicted in FIG. 11, the circumferentially spaced radial ribs 162 project from the annular face 128 of the annular flange portion 226 aligned with corners 225 of the polygonal outer surface 234. Each radial rib 162 has a top face 164 spaced above the plane of the annular end face 128. The top face 164 of each radial rib 162 is inclined radially outwardly from the radial flange portion 126 as illustrated and described above with regard to the radial ribs 162 of the clinch spacer 120 illustrated in FIGS. 8 through 10. The radial ribs 162 further include side faces 168 which, as described above, are inclined outwardly from the top face 164 forming a trapezoidal-shape in cross-section.

The annular end face 128 of the annular flange portion 126 is driven against the panel 52 adjacent the panel opening 54, thereby deforming the rib or ribs 162 into the second face 64 of the panel 52. Where the annular end face 128 of the annular flange portion 126 are circumferentially spaced and radially inclined, as described above, the ribs 162 are driven into the panel 52, starting with the radial outer ends of the ribs 162, and moving progressively inwardly thereby assuring full deformation of the panel 52 by the ribs 162 improving torque resistance of the clinch spacer 120. The panel 52 is deformed radially inwardly, forming a secure mechanical interlock between the clinch spacer 120 and the panel 52 as set forth above and the circumferentially spaced radial ribs 162 prevent rotation of the clinch spacer 120 relative to the panel 52.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Having described one preferred embodiment of a method of attaching a clinch spacer to a panel of this invention, the method of this invention is now claimed as follows.

The invention claimed is:
1. A clinch spacer for engaging a panel, comprising:
a body portion having an axial bore;
an annular flange portion extending radially surrounding said bore having a generally planar annular face;
an annular barrel portion integral and coaxially aligned with said annular flange portion surrounding said bore and including an end face having an outer annular lip extending at an angle radially outwardly and axially from said end face of said annular barrel portion; and a plurality of radial ribs projecting from said annular face, each radial rib inclined toward said annular barrel portion for sequential and incremental driving engagement with the panel as said radial ribs are moved progressively inwardly into the panel being fully deformed, thereby achieving improved torque resistance of said clinch spacer relative to the panel.

2. The clinch spacer as defined in claim 1, wherein said radial ribs each have a top face inclined radially outwardly from adjacent said annular flange portion.

3. The clinch spacer as defined in claim 2, wherein said radial ribs are trapezoidal in cross-section, each having side faces inclined outwardly from said top face to said annular face of said annular flange portion.

4. The clinch spacer as defined in claim 3, wherein said annular flange portion has a polygonal outer surface and said circumferentially spaced radial ribs project from said annular face of said annular flange portion aligned with corners of said polygonal outer surface.

5. A fastener element and panel assembly, comprising:
a panel having an opening therethrough;
a fastener having body portion having an axial bore, an annular flange portion extending radially surrounding said bore having a generally planar annular face; an annular barrel portion integral and coaxially aligned with said annular flange portion surrounding said bore and including an end face having an outer annular lip extending at an angle radially outwardly and axially from said end face of said annular barrel portion; and
a plurality of radial ribs projecting from said annular face for sequential and incremental driving engagement with said panel as said radial ribs are moved progressively inwardly into said panel being fully deformed into said panel thereby improved torque resistance of said clinch spacer relative said panel.

6. The fastener and panel assembly as defined in claim 5, wherein said radial ribs are trapezoidal in cross-section, each having opposed side faces inclined outwardly from said top face to said annular face of said annular flange portion.

7. The fastener and panel assembly as defined in claim 5, wherein said plurality of radial ribs project from said annular face inclined toward said annular barrel portion.

\* \* \* \* \*